Figure 1:
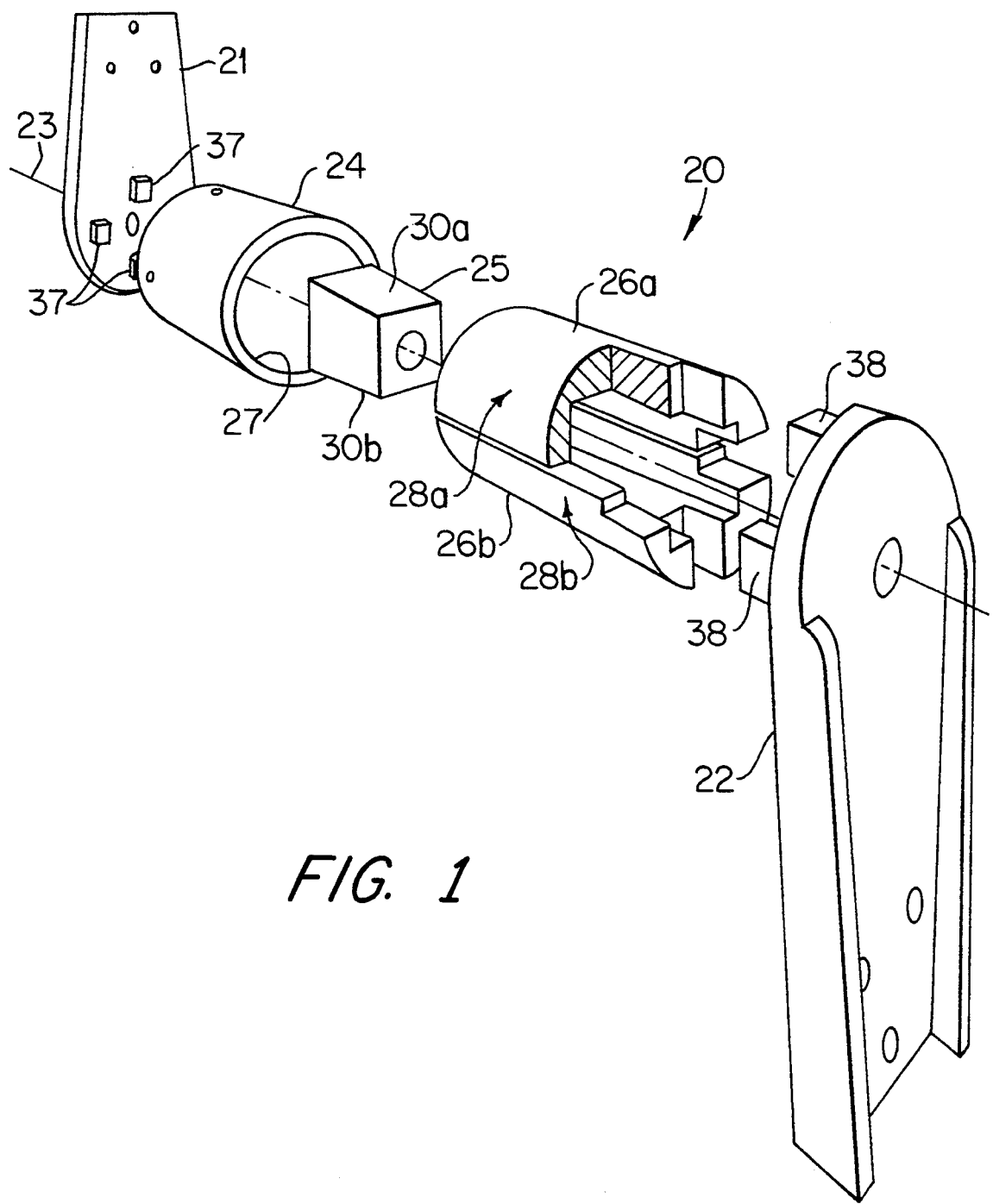

United States Patent

Meeuwissen

[11] Patent Number: 5,388,308
[45] Date of Patent: Feb. 14, 1995

[54] VACUUM ARM JOINT ASSEMBLY

[76] Inventor: Gerard H. Meeuwissen, 38 Bowman Avenue, Camden N. S. W. 2570, Australia

[21] Appl. No.: 922,524

[22] Filed: Jul. 31, 1992

[30] Foreign Application Priority Data

Aug. 2, 1991 [AU] Australia .............................. 81541/91

[51] Int. Cl.6 ............................................. E05C 17/64
[52] U.S. Cl. ....................................... 16/340; 285/184; 285/421
[58] Field of Search ................. 285/184, 181, 44, 907, 285/421; 188/381; 16/339, 340, 341, 342

[56] References Cited

U.S. PATENT DOCUMENTS

| | | | |
|---|---|---|---|
| 679,222 | 7/1901 | Filiatrault | 285/184 |
| 2,423,069 | 6/1947 | McElhose et al. | 285/184 X |
| 2,581,047 | 1/1952 | Salmond et al. | 285/184 X |
| 2,584,283 | 2/1952 | Oliver et al. | 285/421 X |
| 3,409,315 | 11/1968 | Wichers et al. | 285/907 X |
| 3,837,042 | 9/1974 | White | 16/339 |
| 4,540,202 | 9/1985 | Amphoux et al. | 285/184 |
| 4,860,644 | 8/1989 | Kohl et al. | 285/184 X |

FOREIGN PATENT DOCUMENTS

| | | | |
|---|---|---|---|
| 50752 | 1/1973 | Australia . | |
| 69984 | 6/1974 | Australia . | |
| 104553 | 8/1964 | Norway | 16/339 |
| 208493 | 10/1966 | Sweden | 16/340 |
| 201449 | 8/1923 | United Kingdom | 16/340 |

OTHER PUBLICATIONS

Australian Official Action dated Mar. 25, 1993 from Australian Industrial Property Organization Patent Office.
CORAL-No-Smoke, Anti Pollution System-CORAL, S.p.A.-Strada Volpiano, 52/54–10040 Leini, Torino, Italy (Four page brochure, including drawings).

*Primary Examiner*—Dave W. Arola
*Attorney, Agent, or Firm*—Fisher & Associates

[57] ABSTRACT

A friction joint assembly 20 comprising a first arm 21 and a second arm 22 pivotally connected about pivot means, the pivot means including mechanical adjustment means comprising opposed frictional components adapted to be urged, one against the other, axially from a central axis region 23 about which the opposed frictional components are generally radially disposed.

In a particular form, the opposed frictional components comprise a tubular member 24 on the one hand and opposed half members 26a, 26b located within the tubular member 24 on the other hand having a common frictional surface defined between them.

The friction joint assembly 20 forms part of a vacuum arm assembly including at least one bendable joint supported by the friction joint assembly 20.

4 Claims, 3 Drawing Sheets

VACUUM ARM JOINT ASSEMBLY

The present invention relates to a friction joint assembly for use with articulated arms used for bendable support of vacuum hoses and the like.

Conventional devices for providing the friction required to counter balance the weight of an articulated arm at pivot points along the arm typically include two planar plates which are urged together by means of a bolt threaded through both plates and held by means of a nut. Counter balancing friction is provided by the interaction of the opposed faces of the plates when they are urged together by tightening the nut on the bolt.

A particular problem with this form of prior art arrangement is that as the required counter balancing torque becomes large, the cross-sectional area of the plates (and specifically the opposed faces) must become quite large. Large plates tend to warp easily and tend not to provide a predictable torque characteristic related directly or consistently to the force with which the plates are urged together.

It is an object of the present invention to ameliorate the above mentioned problem.

Accordingly, in one broad form of the invention, there is provided a friction joint assembly comprising at least a first arm and a second arm pivotably connected about pivot means, said first arm and said second arm being adapted to be moveable about said pivot means with respect to each other when urged by a force of at least a pre-determined magnitude above a pre-determined threshold magnitude; said force being adjustable by mechanical adjustment means forming part of said joint assembly.

Preferably, the mechanical adjustment means comprises opposed frictional components adapted to be urged, one against the other, axially from a central axis region about which said opposed frictional components are generally radially disposed.

Preferably said opposed frictional components comprise a first friction component enclosing a second friction component.

Preferably said second friction component comprises first and second half components adapted to define an internal volume therebetween when placed in near mating or mating relationship.

Preferably said volume is adapted to receive a generally wedge shaped expander component which causes said first and second half components to move away from said central axis region, the further said expander intrudes into said volume.

Preferably said first friction component comprises a tube.

Preferably the mating surfaces between said first friction component and said second friction component lie generally parallel to said central axis region.

More preferably the mating surface between said first friction component and said second friction component is generally conical in shape and lies radially about said central axis region.

In a further broad form of the invention, there is provided a vacuum arm assembly including at least one bendable joint supported by the friction joint assembly as described above.

Figure 2:
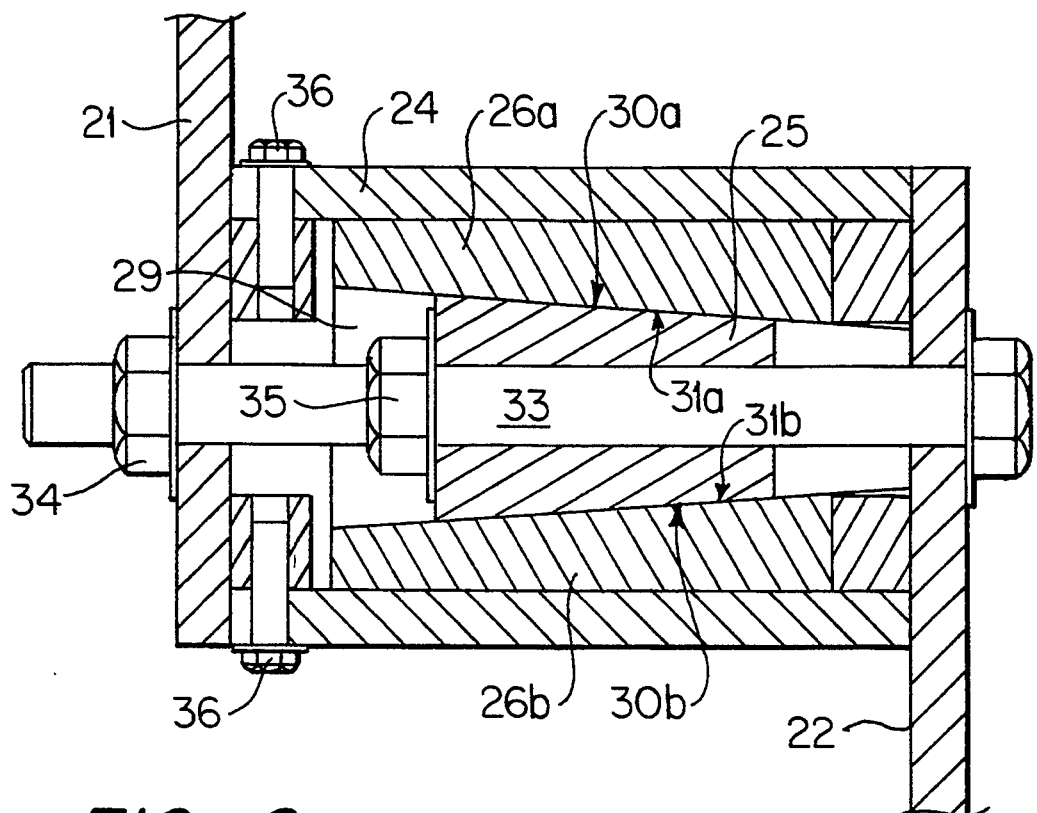
Figure 3:
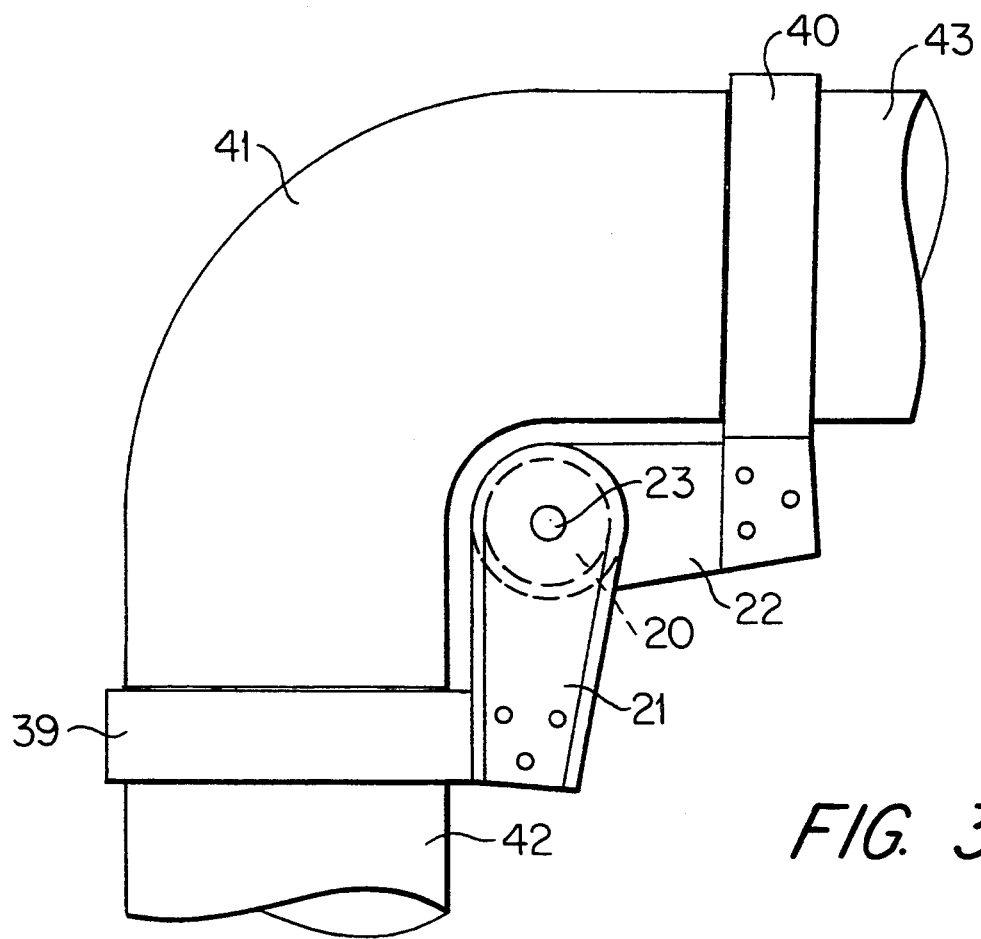
Figure 4:
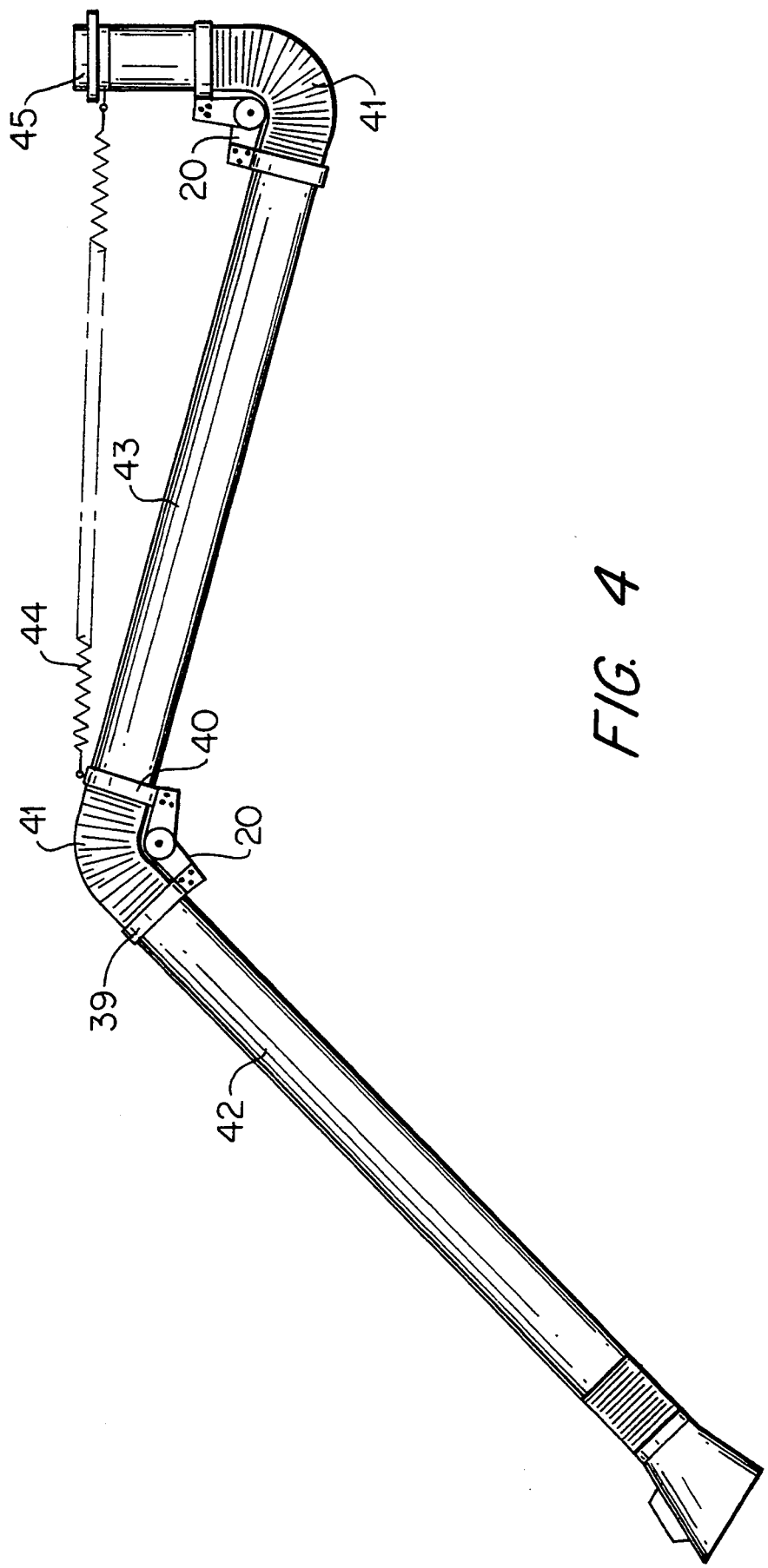

In order that the invention may be more readily understood and put into practical effect, reference will now be made to the accompanying drawings wherein;

FIG. 1 is an exploded perspective view of a friction joint assembly according to one embodiment of the invention, FIG. 2 is a side section view of the friction joint assembly of FIG. 1, FIG. 3 is a side view of a bend region of a flexible hose supported by a support assembly which includes the frictional joint assembly of FIGS. 1 and 2; and FIG. 4 is a side view of a vacuum arm incorporating two support assemblies of the type shown in FIG. 3.

The friction joint assembly 20 shown in FIG. 1 comprises a first arm 21 which is frictionally, pivotally connected about a common axis 23 to a second arm 22. In this embodiment, the first and second arms are connected along the common axis 23 by way of at least three additional intervening components.

These components are a tubular member 24, an expander 25 and a pair of half members 26a, 26b. The expander 25 is adapted to fit slideably along axis 23 within a volume defined between half members 26a, 26b. In turn, the half members 26a, 26b, when assembled, are adapted to slideably fit along axis 23 within tubular member 24.

First arm 21 is connected to an edge portion of tubular member 24 whereby rotation of first arm 21 about common axis 23 will cause rotation of tubular member 24 about the same axis and vice versa.

The second arm 22 is connected to an end portion of both half members 26a, 26b whereby rotation of second arm 22 about common axis 23 causes rotation of the half member pair 26a, 26b and vice versa.

The manner of connection of the second arm 22 to the half members 26a, 26b must accommodate, to a limited extent, the movement of the half members 26a, 26b towards and away from each other about common axis 23 for the purposes of adjustment of the friction joint assembly as will be described below.

The interacting frictional surfaces which provide the appropriate degree of resistance to rotation of the first arm 21 with respect to the second arm 22 about common axis 23 are the interior surface 27 of tubular member 24 as applied against both of the external curved surface 28a of half member 26a and exterior curved surface 28b of half member 26b.

The structure which allows these surfaces to be urged one against the other resides in the external shape of at least a portion of the expander 25 and the internal shape of at least a portion of the volume 29 defined between the half members 26a, 26b.

Specifically, in this embodiment, expander 25 includes four sides, two opposed ones 30a, 30b are slanted with respect to each other about a common axis 23 whereby a wedge shape is created. The internal mating surfaces 31a of half member 26a and 31b of half member 26b within volume 29 are slanted to the same degree and in the same direction whereby a large, relatively flat mating surface is defined by and between slanted side 30a and internal surface 31a and between slanted side 30b and internal surface 31b.

Consequently, as expander 25 is urged further into volume 29 along axis 23, the effect is to cause half members 26a and 26b to be urged mutually radially outwardly from axis 23 whereby exterior curved surfaces 28a, 28b are urged against interior surface 27 of tubular member 24.

With reference to FIG. 3, a long threaded bolt 33 can be threaded through the abovementioned components wherein the whole assembly is retained assembled by assembly nut 34 whilst the degree of intrusion of expander 25 into volume 29 is determined by the setting of intrusion nut 35.

In a particular embodiment of the invention the tubular member 24 is made from nylon whilst the half members 26a, 26b and expander 25 can be made from aluminium.

It will be noted from FIGS. 2 and 3 that the manner of attachment of the first arm 21 to the end of the nylon tube 24 is by four bolts 36 which respectively pass through four holes in the periphery of the tubular member 24 and screw into four projections 37 spaced symmetrically on first arm 21 about the point at which common axis 23 passes through the first arm 21.

The second arm 22 has projections 38 distributed symmetrically about the point at which common axis 23 passes through the second arm. These projections 38 are slideably received within corresponding slots in the assembled half members 26a, 26b whereby the second arm 22 and the two half members 26a, 26b are rotatably interconnected but the half members are permitted to move either toward or away from each other radially about common axis 23 under the influence of expander 25.

With the first hose clamp 39 secures one end of a first stiff tube member whilst second hose clamp 40 clamps one end of a second stiff tube member 43. A flexible hose 41 interconnects the clamp ends of the first stiff tube member 42 and the second stiff tube member 43 so as to be bendable about the common axis 23.

The torque on intrusion nut 35 is adjusted so as to provide the appropriate degree of friction between interior surface 27 of tubular member 24 and the exterior curved surfaces 28a, 28b of half members 26a, 26b whereby the friction joint assembly 20 will support the weight of first stiff tube member 42 and second stiff tube member 43 without the tube members 42, 43 bending about common axis 23. The torque setting is such that if a predetermined additional bending moment is applied about common axis 23 by exertion of an appropriate force on either or both of the tube members 42, 43 then the tube members 42, 43 will bend about common axis 23 and flexible hose 41 will flex to accommodate the change in angular orientation between tube members 42 and 43. Uponremoval of the additional force, the assembly returns to static equilibrium.

FIG. 4 shows a vacuum arm assembly utilising two friction joint assemblies 20 at two bend points with a spring 44 used to provide additional predetermined resistance to bending of the friction joint assembly 20 closest to swivel join 45.

The above describes only one embodiment of the present invention and modifications obvious to those skilled in the art can be made thereto without departing from the scope and spirit of the present invention.

I claim:

1. A friction joint assembly comprising at least a first arm and a second arm pivotally connected to each other by pivot means incorporating mechanical adjustment means, said first arm and said second arm being adapted to be pivotable about said pivot means about a central axis region of said assembly with respect to each other only when urged by a force of at least a pre-determined magnitude above a predetermined threshold magnitude, wherein said central axis is a longitudinal axis common to the components comprising said friction joint assembly;

said force being adjustable by said mechanical adjustment means and wherein said mechanical adjustment means comprises an expander and opposed frictional components adapted to be urged by said expander, one against the other, radially from said central axis region about which said opposed frictional components are generally radially disposed;

a bolt passed along said central axis region through all the components of said friction joint assembly and at least a first nut threadably received on an end of said bolt so as to clamp said components together along said central axis, said bolt and said first nut being part of said friction joint assembly region; and wherein said opposed frictional components comprise a first friction component enclosing a second friction component; said first friction component comprising a tube; said second friction component comprising first and second half components which define an internal volume therebetween when placed in opposed relation to each, other said first friction component connected to said first arm and said second friction component connected to said second arm, said expander comprising a generally wedged shaped expander component which causes said first and second half components to move away from the central axis region, the further said expander is caused to intrude into said volume whereby said force is varied by the degree to which said second component is urged against said first component by the action of said expander receivable within said internal volume.

2. The friction joint assembly of claim 1 wherein a second nut forming part of said mechanical adjustment means is utilized to urge said expander into said volume by rotation thereof on a threaded portion of said bolt.

3. The friction joint assembly of claim 1 wherein the mating surfaces between said first friction component and said second friction component lie generally parallel to said central axis region.

4. The friction joint assembly of claim 1 wherein the mating surface between said first friction component and said second friction component is generally cylindrical in shape and lies radially about said central axis region.

* * * * *